Sept. 24, 1929.  J. F. CAVANAGH  1,729,326
CURRENT RECTIFIER
Filed Aug. 11, 1927    3 Sheets-Sheet 1
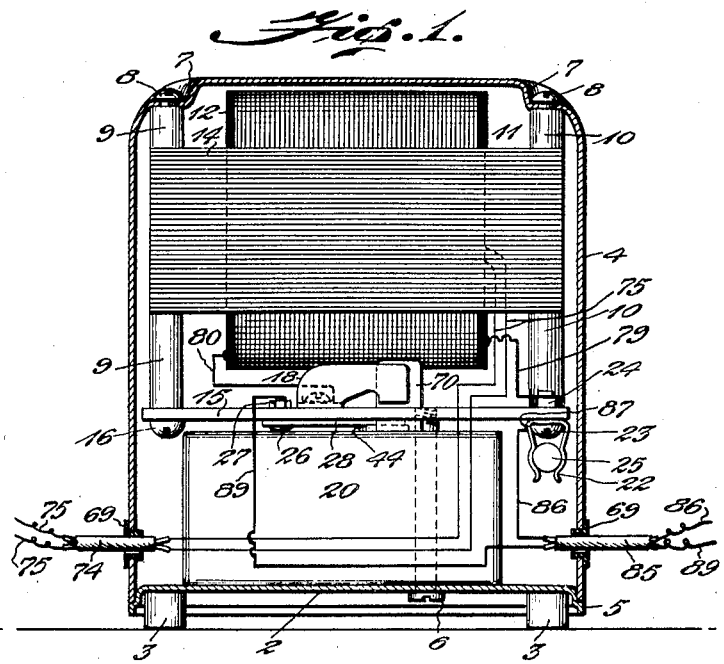
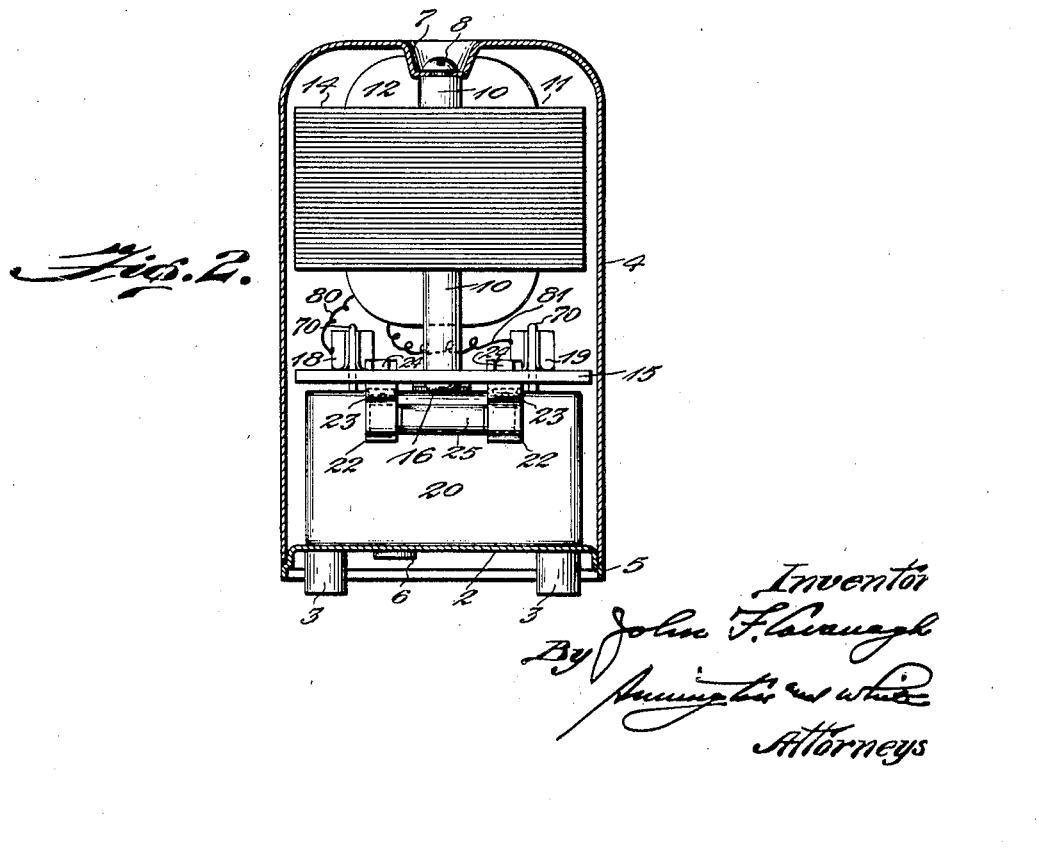

Sept. 24, 1929. J. F. CAVANAGH 1,729,326
CURRENT RECTIFIER
Filed Aug. 11, 1927 3 Sheets-Sheet 2
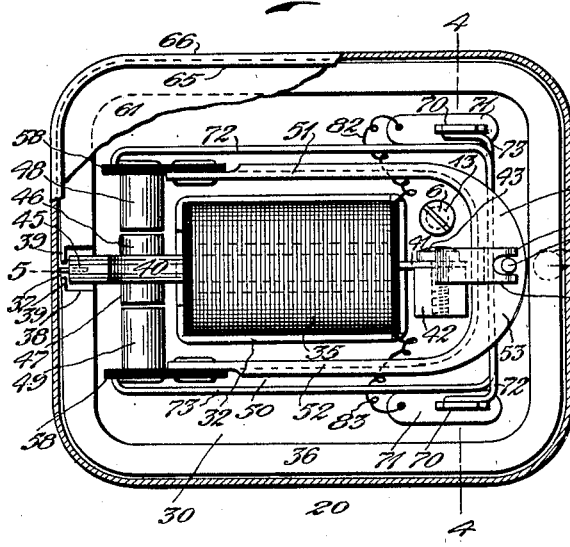
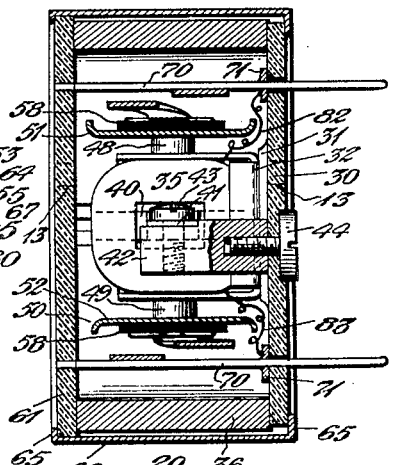
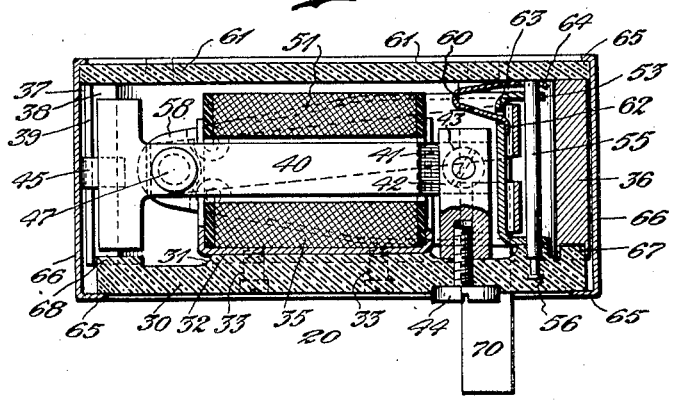
Inventor
John F. Cavanagh
By Pennington and White
Attorneys Sept. 24, 1929.  J. F. CAVANAGH  1,729,326
CURRENT RECTIFIER
Filed Aug. 11, 1927  3 Sheets-Sheet 3
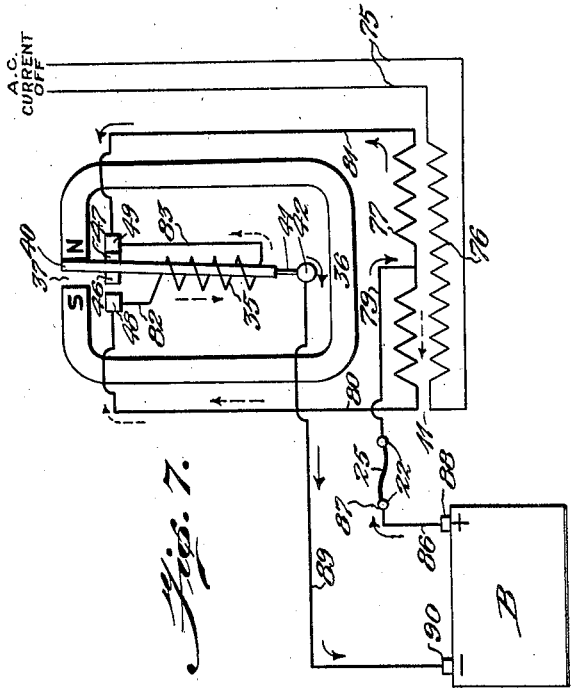
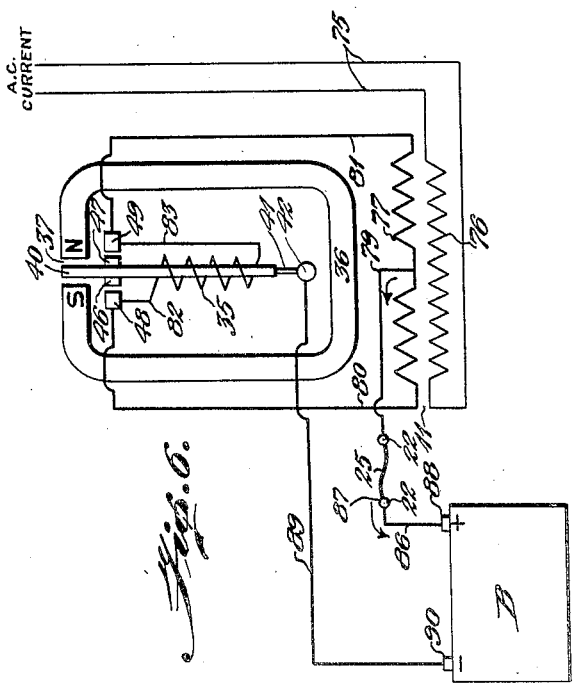
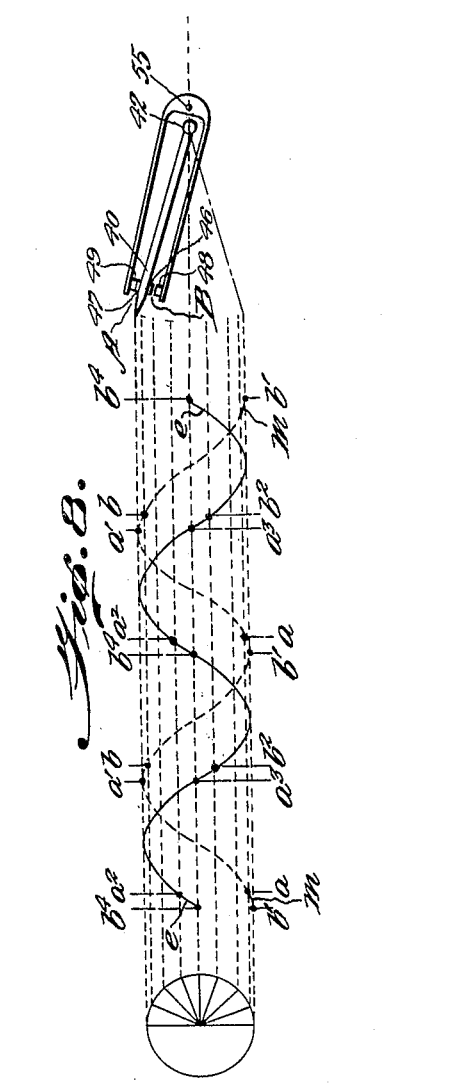
Inventor
John F. Cavanagh
Attorneys Patented Sept. 24, 1929

1,729,326

UNITED STATES PATENT OFFICE

JOHN F. CAVANAGH, OF PROVIDENCE, RHODE ISLAND, ASSIGNOR TO APCO MANUFACTURING COMPANY, OF PROVIDENCE, RHODE ISLAND, A CORPORATION OF RHODE ISLAND

CURRENT RECTIFIER

Application filed August 11, 1927. Serial No. 212,251.

This invention relates to alternating current rectifiers for use in charging electric storage batteries and particularly to rectifiers of the vibrator type.

A principal object of the invention is to secure a relatively long period of contact of the vibrating element without excessive sparking at the contact points.

Another object of the invention is to provide a current rectifier adapted for continuous operation without requiring either preliminary or periodic adjustment of the contacts or other setting of the elements.

Another object of the invention is to provide a device of the type specified which is proof against "feed-back" from the battery when the rectifier is inoperative either from defect in its mechanism or failure of the charging current.

Another object of the invention is to provide a current rectifier of the type specified in which the vibrating element has a natural period closely approximating the period of frequency of the A. C. current to be rectified.

Another object of the invention is to provide a compact enclosed device of the type specified which is of simple construction, economical to manufacture, and possesses higher efficiency, greater dependability, and increased durability over similar devices now in use.

Further objects of the improvement are set forth in the following specification which describes a preferred embodiment of the invention as illustrated in the accompanying drawings. In the drawings:

Fig. 1 is a side view of the complete device showing its casing in section and illustrating the general arrangement of the interior operating elements;

Fig. 2 is an end view of the device also showing its casing in section;

Fig. 3 is an enlarged plan view of the vibrator unit of the device showing the casing in which it is sealed as partly broken away;

Fig. 4 is a cross-sectional view of the same taken on line 4—4 of Fig. 3;

Fig. 5 is a longitudinal sectional view of the vibrator unit taken on line 5—5 of Fig. 3;

Figs. 6 and 7 are diagrammatic views showing the wiring for the various circuits; and Fig. 8 is a schematic view illustrating the mechanical cycle of operation of the vibrator as compared with the electrical cycle of the current.

Figs. 1 and 2 illustrate the general arrangement of the complete current rectifier or battery charger in its preferred form. The electrical elements of the device, including a usual type of transformer, the electro-mechanical vibrator unit, and the wiring for the several circuits are arranged in compact form and completely enclosed in a box or casing which may be made of sheet metal. As herein shown, the casing comprises a base 2 resting on rubber feet 3 and surmounted by the box-like cover 4. The cover 4 may be of substantially rectangular shape with its lower rim adapted to fit around and seat against a suitable flanged rest 5 on the base 2. The parts of the casing may be fastened together by any suitable means and preferably I employ certain screws for this purpose which also serve as the means for securing the different units of the electrical and mechanical mechanism within the casing. As shown in Figs. 1 and 2, the cover 4 of the casing is formed on the top with indented sockets 7 at either side adapted to receive the heads of suitable screws 8 which are threaded into the ends of two vertical posts 9 and 10 forming the support for the transformer 11. The transformer 11 may be of any preferred type and as herein illustrated it comprises the usual coil or windings 12 and a series of laminations or field-plates 14 supported from the posts 9 and 10. The windings 12 of the transformer comprise the usual primary and secondary, and the secondary is of the split-wind type having a center lead which divides it into two equal parts in the manner and for the purpose as hereinafter more specifically explained.

Secured to the bottom of the posts 9 and 10 and substantially bridging the space within the sides of the cover 4 is a shelf or plate 15 constructed of fiber, bakelite, or other suitable insulating material and serving as a mounting for certain parts of the electrical apparatus. The plate 15 is secured to the bottom of the posts 9 and 10 by means of screws 16 threaded thereinto.

Mounted on top of the plate 15 are two jacks 18 and 19 which are wired to the coil or windings 12 of the transformer 11 in the manner as later explained and adapted to receive suitable plug contacts on the vibrator unit 20 to connect the latter in circuit therewith. Mounted on the under side of the plate 15 at one end thereof are a pair of clips 22 secured in place by suitable screws 23 and nuts 24. The clips 22 are adapted to hold a usual type of cartridge fuse 25 which is connected in the output current circuit in the manner as later explained. Fastened to the under side of the shelf or plate 15 by means of a screw 26 and nut 27 is a spring-contact plate 28 which, with the jacks 18 and 19, form the three electrical connections in the circuits between the transformer and the vibrator unit 20. The wiring connections to the spring-contact 28 are described hereinafter with reference to the wiring diagram for the complete apparatus.

The vibrator unit 20, in which is embodied the essence of the present invention, is preferably made entirely separate from the other elements of the device above described. That is to say, this part of the apparatus constitutes a complete unit in itself and is constructed in such form that it may be readily detached from the rectifier for repair or replacement. Moreover, it is preferable to seal the vibrator mechanism within a separate box or casing so that it cannot be tampered with or its adjustment altered after it has once been set for proper operation. The vibrator unit 20 is illustrated in the enlarged views Figs. 3, 4 and 5; and for convenience of illustration it is shown in inverted position in Figs. 3 and 5, while Fig. 4 is a straight projection from Fig. 3. In operative position the mechanical elements of the device are suspended from the top of the casing 4, but to make the present showing clearer the position of the unit is reversed in Fig. 3 so that in reality this figure represents a bottom plan view. For the purpose of this description, therefore, the main mounting 30 for the vibrator unit may be considered as its base. The plate or base 30 is constructed of bakelite or similar dielectric material and is provided with a boss or flat rest 31 to which is fixedly attached a sheet-metal casing or cradle 32 for holding a winding or polarizing coil 35. The cradle 32 may be constructed in two halves which are fastened to the rest 31 by means of screws 33. Extending around the marginal edges of the base-plate 30 is a rectangularly-shaped permanent field-magnet 36 of the horseshoe type, preferably constructed of hard steel and having its ends spaced apart at 37 to provide an opening or gap 38 in which the contact-breaker or vibrator oscillates. The terminals of the magnet are preferably formed with thinner portions or blades 39 projecting towards each other with a narrower gap or opening therebetween for a purpose as later explained.

Projecting through the axial opening of the polarizing coil 35 is an armature or vibrator arm 40, preferably of laminated structure embodying overlying metal strips, and of T-shape in side view as shown in Fig. 5. At the opposite end from its T-head the arm 40 is provided with a thin resilient blade 41 which serves as a spring-element for mounting the armature to adapt it to oscillate laterally to perform its function as a vibrator or contact-breaker. The spring-blade 41 is fixedly attached to the side of a vertical post 42 by means of a screw 43. The post 42 is secured fast to the base-plate 30 by means of a flat-headed screw 44 inserted therethrough and screwed into the end of post. The head of the screw 44 is adapted to make contact with the spring-plate 28 on the shelf 15 when the vibrator unit is inverted in position and attached thereto as shown in Figs. 1 and 2, this connection completing one of the electrical circuits as later explained. The forward T-head of the vibrator arm or circuit-breaker 40 is normally held in neutral position between the terminals of the field-magnet 36 as shown in Fig. 3, and projecting therefrom is a thin strip of dielectric material 45 which is adapted to contact with the projections 39. The element 45 thus functions to prevent the armature or vibrator 40 from touching the ends of the magnet 36 whereby to eliminate the danger of its sticking thereto under the magnetic force. The vibrator arm or armature 40 carries two contact buttons 46 and 47 on its opposite sides, these being preferably of tungsten or other suitable metal not easily susceptible to pitting or erosion.

The contacts 46 and 47 are adapted to impinge against two opposite similarly-constructed contacts 48 and 49 which are normally held in position to provide a very slight gap. The contacts 48 and 49 are mounted on a U-shaped yoke 50 which is pivoted to swing about a vertical axis disposed beyond the post 42 on which the vibrator 40 is swiveled. The yoke 50 is preferably constructed of sheet-metal having two opposite arms 51 and 52 of relatively thin cross-section and flanged over at top and bottom to stiffen the structure. The flange 53 is widened at the base of the yoke and provided with registering holes for receiving a vertical pin 55 on which the yoke is pivoted. The pivot-pin 55 is provided with a T-head 56 molded into the bakelite base-plate 30 to support the pin rigidly therefrom. The contact buttons 48 and 49 are carried at the end of the arms 51 and 52 of the yoke 50 on insulating strips 58. The insulating strips 58 may be of fiber or bakelite riveted or otherwise suitably secured to the ends of the arms of the yoke 50. Referring particularly to Figs. 3 and 5, the loop of the yoke 50 carries a bent spring 60 designed to press against the top-plate 61 of the casing which encloses the vibrator unit. The spring 60 is of hairpin shape having one of its legs curled over at 62 and adapted to hook through an opening 63 in the vertical portion of the loop of the yoke 50. The opposite leg of the spring 60 bears against the plate 61 as previously mentioned and its end is bifurcated at 64 to straddle the pin 55 whereby to hold it in position. The spring 60 tends to press the yoke against the base-plate 30 to hold it in place and also to provide a slight frictional resistance to its swinging action.

The plate 61 may consist of a strip of fiber or bakelite resting against the flat edge of the field-magnet 36 and fastened in position to form the cover for the casing enclosing the complete vibrator unit. As illustrated in Figs. 3, 4 and 5, the cover-plate 61 and the base-plate 30 are held between the flanged over rims 65 of a surrounding strip 66 forming the sides of the box or casing. The strip 66 is preferably constructed of sheet-metal with its edges bent or flanged over the rims of the two plates 61 and 30 to seal the whole casing to prevent unauthorized access to the apparatus enclosed therein. As shown in Figs. 3 and 5, a dowel-pin 67 formed integral with the base-plate 30 projects into a suitable hole in the edge of the field-magnet 36 at one end thereof, while a raised lip or block 68 at the opposite end of the plate fits between the spaced terminals of the magnet. Through this means the magnet 36 is positively located and held in position with its edges abutting the rim of the base-plate 30, the top and bottom plates of the casing being held in place against the magnet by means of the binder strip 66. This construction provides an extremely simple and efficient housing for the vibrator parts and one which is particularly staunch to resist shock and jar.

As indicated in Figs. 3 and 4, the winding 35 is wired to two jack plugs 70 which provide one set of electrical connections between the vibrator unit 20 and the transformer 11. As shown more particularly in Fig. 4, the jack plugs 70 may consist of flat blades imbedded at one end in the top-plate 61 and projecting through openings in the base-plate 30. The blades 70 project through and are soldered to plates 71 which set against the plate 30 and provide means for attaching the lead wires, to be later designated, from the winding 35. The plugs 70 are also electrically connected to the contacts 48 and 49 of the circuit-breaker. Preferably, I employ a flat spring conductor for this purpose to eliminate wiring connections which are liable to impede or restrict the movement of the contact yoke 50. One strip of flat conductor 72 is soldered to the side of the jack-blade 70, and reaching across the base of the yoke 50, is bent around to project outwardly with its end soldered or otherwise electrically connected to the contact 48. A similar conductor-strip 73 soldered to the side of the other jack-blade 70 reaches across in the opposite direction and extends forwardly to the contact 49.

The parts of the rectifier are assembled within its casing in the manner as next described: The transformer 11, mounted on the supporting posts 9 and 10, is suspended from the top of the cover 4 by means of the screws 8 inserted therethrough and screwed down into the posts. The plate 15 carrying the jacks 18 and 19, the fuse-clips 22 and the spring-contact 28 is fastened to the bottom of the posts 9 and 10 by means of the screws 16, it being understood that the plate has suitable openings for receiving the jack-plugs 70 which project from the top of the vibrator unit 20. The vibrator unit 20 is simply set in place by pushing its contact-blades 70 up through the openings in the plate 15 to engage them between the spring arms of the jacks 18 and 19 as shown in Figs. 1 and 2. When the vibrator unit 20 is applied to position in this manner the head of the screw 44 which holds the supporting post 42 for the armature 40 is pressed against the spring-contact 28 whereby to complete the electrical circuit to the armature 40 as hereinafter described.

A suitable fuse 25 is inserted in the clips 22 and the cover 4 then fitted over the rim of the base 2. A single screw 6, shown in Fig. 1, is then inserted through a hole in the base 2 to project up through suitable holes 13, indicated in Figs. 3 and 4, in the plates 30 and 61 of the vibrator unit 20. The end of the screw 6 is screwed into a threaded hole in the plate 15 and through this means and the posts 9 and 10 the base 2 and cover 4 are clamped together to provide a practically dust-tight and water-proof casing or enclosure for the assembled elements of the apparatus. When it is required to examine the mechanism of the device or to remove the vibrator unit 20 for repair or replacement it is only necessary to remove the screw 6, thereby releasing the cover 4 from the base 2 to permit the vibrator unit to be withdrawn The mechanical elements of the vibrator unit having now been described in detail the electrical connections for the several circuits of the complete device will next be explained with reference to the diagrammatic view, Figs. 6 and 7. As indicated in these diagrams and also in Fig. 1 of the drawings, a cable 74 comprising two conductors 75 leads through an insulator 69 in the side of the casing 4 of the apparatus and is provided at its end with a suitable connector, not herein shown, for plugging into a light socket or base-board outlet of the house wiring system. Assuming that the wiring system carries the usual 110 volt A. C. current the input to the rectifier will flow through the cable conductors 75 to the primary winding 76 of the transformer 11 as indicated in Figs. 6 and 7. The secondary split-winding of the transformer is indicated at 77 in the diagrams and the split-winding lead therefrom is designated 79 and shown as connected to one end of the fuse 25, this connection being made by means of the binding-post comprising the screw 23 and nut 24 previously referred to as employed for attaching the fuse-clip 22 to the plate 15, see Fig. 1. The opposite ends of the secondary winding 77 have leads 80 and 81 leading to the two opposite contacts 48 and 49 carried on the arms of the yoke 50 shown in Fig. 3. These contacts are also connected through conductors 82 and 83 leading to the polarizing-coil 35.

Entering the opposite side of the cover 4 from the A. C. current cable 74 is a cable 85, see Fig. 1, one conductor 86 of which is connected at 87 to the fuse-clip 22 at the end opposite from that connected to the secondary winding of the transformer through the split lead 79. This last conductor 86 is provided at its end with the usual clip for attaching it to the plus pole 88 of the battery B to be charged, as indicated in the diagrams, Figs. 6 and 7. The other conductor 89 of the cable 85 has a clip for attachment to the negative pole 90 of the battery B and leads to the armature or contact-breaker 40 of the vibrator unit through connections as next described.

The electrical connections between the vibrator unit 20 and the transformer 11 are made by simply plugging the blades 70 into the jacks 18 and 19 when the unit is assembled within the main casing of the device in the manner as previously explained. As illustrated in Fig. 2 of the drawings one jack 18 has a lead 80 to one end of the secondary winding 77 and the other jack 19 is connected to the other end of the secondary winding by the lead 81 previously referred to with reference to the diagrams 6 and 7. Referring now to Fig. 3 of the drawings, the two jackblades 70 are connected through their plates 71 with the wires 82 and 83 previously described as leading to the terminals of the polarizing coil 35, it having also been explained that the jacks 70 are electrically connected to the contacts 48 and 49 by means of the flat conductor strips 72 and 73.

The method of operation of the present improved current rectifier is as next explained: Assuming that the cable 74 is plugged into a socket or outlet in the A. C. current circuit and that the other cable 85 has its conductors 86 and 89 connected respectively with the plus and minus poles of the battery B the current from the line will then flow through the conductors 75 to the primary winding 76. The transformer 11 will thus step down the line voltage to the proper charging voltage, the low voltage current being set up in the secondary winding 77 of the transformer, flowing through the leads 80 and 81 to the contacts 48 and 49, and thence through leads 82 and 83 to the polarizing-coil 35. An alternating surge of magnetism is thus induced in the vibrator 40 and, following the law that like poles repel and unlike poles attract, the vibrator 40 is caused to oscillate between the poles of the permanent magnet 36, its vibrations being in synchronism with the line current. It is to be understood that the direction of the winding in each of the two sections of the secondary 77 of the transformer is such that the induced current always flows along lead 79 toward the plus pole 88 of the battery B. The fuse 25 in this branch of the circuit is provided against short circuiting so that there will be no danger that a heavy current may damage the battery under charge.

As each pair of contacts 46, 48 or 47, 49 closes under the oscillating action of the vibrator 40 the circuit is completed through one half of the secondary winding 77 to cause the current to flow in the direction indicated by the arrows in Fig. 6, the circuit from the battery being completed through the lead 89 to the vibrator 40. For instance, when contacts 46 and 48 are closed the current flows through the lead 80 and the left-hand half of the secondary 77, as viewed in Fig. 6; while, on the other hand, when the contacts 47 and 49 are closed the current flow is in the opposite direction through lead 81 and the other half of the secondary 77. It will thus be seen that the vibrator 40 acts in synchronism with the alternating current to switch first one half and then the other half wave through the battery to charge the latter in the manner as well understood by those versed in the art.

It is well known that devices of the present type have as an inherent characteristic a considerable phase difference between the mechanical cycle of the vibrating element and the electrical or current cycle. Due to this phase difference it has heretofore been only possible to allow the contacts to be closed for a comparatively small portion of the half wave without causing prohibitive sparking. In fact, satisfactory operation is dependent upon accurate adjustment of the contacts, and such adjustment must be made at frequent intervals, as otherwise the contacts become pitted and eroded making replacement necessary.

In the present improved device the disadvantages and defects of prior devices of this type are entirely eliminated, thus obtaining greater efficiency and dependability in the operation of the apparatus and materially increasing its durability. These advantages are accomplished through a new principle of operation which will now be explained in detail. It has been noted that the two contacts 48 and 49 are carried at the end of the arms of the yoke 50, which latter element is pivoted on the pin 55 to adapt it to swing laterally with respect to the axis of the polarizing coil 35. It is also to be noted that the opening or gap between the contacts 46 and 47 of the vibrator 40 and the respective contacts 48 and 49 on the yoke is relatively slight when the vibrator stands in neutral position as shown in Fig. 3. On the other hand, the length of movement of the vibrator arm 40 is considerably greater than the sum of the distances between the contacts, each outer contact 48 and 49 being adapted to move with its respective center contact 46 or 47 when the latter makes contact therewith and swings in one direction or the other. Stated briefly, as the arm 40 moves its contact 46 against the associated opposite contact 48 and continues its movement in this direction it will carry the contact 48 with it as the yoke 50 is swung on its pivot 55. The reverse action takes place when the arm 40 swings in the opposite direction to carry its contact 47 against the other yoke contact 49. After the vibrator 40 has reached the limit of its throw and starts to swing back in the opposite direction its contact 46 will immediately break contact with the yoke-contact 48 against which it has been pressing and the yoke at this juncture is restrained from swinging back with the arm 40 by the friction exerted by its spring 60 which bears against the plate 61 for this purpose. Likewise, when the arm 40 starts to swing back to break the connection between the contacts 47 and 49 the yoke 50 will remain stationary until the contact 46 engages the contact 48 again to move the yoke in the opposite direction. The effect of this novel method of operation of the vibrator is to cause each pair of contacts to break or separate the instant the center contact arm 40 starts to return from the extreme limit of its throw. In returning the arm 40 moves but a few thousandths of an inch before it closes the other pair of contacts which, in turn, remain closed until the arm reaches the other extreme of its throw. The opposite pairs of contacts are thus caused to remain closed through all but a fraction of the complete stroke of the vibrator arm 40, thereby utilizing practically all of the wave length of the current. This effect is clearly illustrated in the schematic view, Fig. 8, where the vibrator and its yoke is shown diagrammatically at the right. In this view of the drawings the electrical or current curve is the conventional A. C. sine curve represented by the full line $e, e$. The mechanical cycle curve, representing the vibratory movement of the contact arm 40, is also a sine curve as delineated by the dash line $m, m$; but owing principally to the inherent phase difference between current and flux, the mechanical cycle is approximately ninety degrees or one-quarter cycle behind the electrical cycle. This condition is common to all rectifiers of the vibrating type.

The chart in Fig. 8 shows the curve $m, m$ of the mechanical cycle impressed upon the electrical cycle curve $e, e$ and the points where the two pairs of contacts open and close are indicated thereon as next explained. For the sake of convenience of description we may designate one pair of contacts A and the other pair B. Contacts A remain closed between points $a$ and $a'$ on the mechanical curve represented by points $a^2$ and $a^3$ on the electrical curve; while contacts B remain closed between points $b$ and $b'$ represented by $b^2$ and $b^4$ on the electrical curve. Due to the fact that the mechanical cycle is approximately one-quarter cycle behind the electrical cycle points $a'$ and $b'$ which are the points where the contacts open, substantially coincide with respect to time with the neutral points on the electrical curve. It is this condition which provides for practically sparkless operation of the device and thus renders it proof against rapid deterioration while also increasing its efficiency in use. The fact that each pair of contacts remain closed for substantially the entire stroke of the vibrator arm makes it possible to utilize a maximum portion of each wave, whereby the efficiency of the whole device is increased.

As another feature of the improvement in the present invention the novel and peculiar arrangement of the outer contacts on the swinging yoke 50 serves to prevent feed-back from the battery. Should the A. C. current fail with either pair of contacts closed, or should a jolt or jar bring the contacts into connection while the device is in circuit with the line current, such contact in the vibrator unit will be broken automatically through the peculiar functioning of the device as next explained. Assuming that the vibrator 40 has come to rest with the contacts 47 and 49 closed as shown in Fig. 7 of the drawings, current will flow through the circuit from the positive pole of the battery back to the negative pole in the direction as indicated by the full line arrows in Fig. 7. In this condition the current will flow through one half of the secondary 77 of the transformer in a direction opposite from that in which the current flows when the same pair of contacts is closed under normal operation from the 110 volt line circuit. Also, it will be noted that a shunt current is passed through the circuit 82, 83 of the polarizing-coil 35 in a direction opposite from that of the energizing current normally acting to close the contacts 47 and 49, the direction of this current being indicated by dotted arrows in Fig. 7. Due to the reversal of the flow of current through the polarizing-coil 35 the arm 40 will be drawn away from the contact 49 and caused to snap back against the opposite contact 48 with sufficient force to kick the yoke 50 back into a position where it is held by its friction means comprising the spring 60 previously described.

In some instances the vibrator arm 40 may not kick the yoke 50 far enough to open the contacts in its first movement, but in such case should the opposite pair of contacts 46 and 48 remain closed the cycle of action is repeated until the yoke 50 eventually finds a position with the arm 40 neutral therebetween so that both of its contacts 46 and 47 are free from the yoke contacts 48 and 49. The consummation of this effect requires but an instant of time due to the great difference in natural periods between the vibrator arm and the yoke.

It will be observed from the above that my invention provides a current rectifier of compact form and extreme simplicity in construction and arrangement. The device is susceptible of being manufactured at low cost and is adapted for operation at maximum efficiency over extended periods and without upkeep expense.

Owing to the novel and peculiar arrangement of the contacts for the vibrator element the deficiences of most rectifiers due to phase difference are entirely eliminated and the complete apparatus rendered more dependable and durable in use.

No adjustment of the vibrator elements is necessary, either initially or after repeated use of the device, the vibrator unit being sealed at the factory to prevent unauthorized tampering with its parts and thus guaranteeing proper operation of the complete apparatus without care or attention on the part of the operator.

As a further feature of improvement the device operates on a noval principle which prevents any possibility of feed-back from the battery, a fault which is usually present in other similar types of rectifiers.

While I have herein illustrated a preferred embodiment of the device, it is obvious that various modifications may be made in the form and construction of its mechanical elements and in its electrical apparatus without departing from the spirit or scope of the invention.

Therefore, without limiting myself to the exact form of construction of the invention as herein shown and described, I claim:

1. A vibrator unit comprising a permanent magnet, a vibrator adapted to oscillate in the field of the magnet, a polarizing-coil for oscillating the vibrator, contacts connected in circuit with a source of current, and means for mounting said contacts for alternate contact with the vibrator while adapting them to be moved in unison one way or the other by the vibrator to secure a maximum period of contact therebetween.

2. A vibrator unit comprising a permanent magnet, a vibrator arm mounted to oscillate in the field of the magnet, a polarizing-coil for oscillating the vibrator arm, contacts arranged at either side of the vibrator arm with a relatively narrow gap therebetween, means for connecting said contacts with a source of current, and means for mounting the contacts to adapt them to be moved in unison by and with the vibrator arm as the latter is swung to one extreme or the other to secure a maximum period of contact therebetween.

3. A vibrator unit comprising a permanent magnet, a vibrator adapted to oscillate in the field of the magnet, a polarizing-coil for oscillating the vibrator, spaced contacts adapted to be alternately engaged by the vibrator, means connecting the contacts in circuit with a source of current, means for mounting the contacts to adapt them to be moved in unison through the engagement of the vibrator with one or the other thereof, and means for resisting the displacement of the contacts to prevent them from moving back with the vibrator as the latter swings away from its extreme of throw.

4. In a device of the type specified, the combination of a permanent magnet, a vibrator arm adapted to oscillate in the field of the magnet, means for oscillating the vibrator arm, a member mounted independently of the vibrator arm and adapted to swing therewith, means for resisting the movement of said member to maintain the latter in one extreme of movement or the other, and contacts carried by said member and adapted to be alternately closed with the vibrator arm.

5. In a vibrator device, the combination of a permanent magnet, a vibrator arm adapted to oscillate in the field of the magnet, a polarizing-coil for causing oscillation of the vibrator arm, a pair of contacts arranged in opposite relation with respect to the vibrator arm, means for mounting said contacts to provide a relatively slight gap between them and the vibrator arm when the latter is in neutral position and to adapt both contacts to be moved in unison in one direction or the other as the vibrator arm swings to its extremes of throw, and means for retaining said contacts stationary as the vibrator arm breaks from one contact and swings toward the other contact.

6. In a device of the type specified, a permanent magnet, a vibrator arm mounted to oscillate in the field of the magnet, a polarizing-coil for oscillating the vibrator arm, a swinging yoke straddling the vibrator arm, contacts carried by said yoke in position to be alternately closed with the vibrator arm during its oscillation and adapted to swing with the yoke at the extremes of movement of the arm, and means for restraining the yoke from movement as the arm breaks from one contact to make connection with the other contact.

7. In a device of the type specified, the combination of a permanent magnet, a vibrator arm mounted to oscillate in the field of the magnet, a polarizing-coil for oscillating the vibrator arm, a yoke pivoted on an axis in the plane of the axis of the vibrator arm, contacts carried at the ends of the arms of the yoke and adapted to be alternately closed with the vibrator arm and to move with the arm as the latter swings to its extremes of throw, and friction means acting on the yoke to restrain it from movement as the vibrator arm breaks from one contact to move toward the other contact.

8. A vibrator unit comprising a permanent magnet, a vibrator arm mounted to oscillate between the poles of the magnet, a polarizing-coil for oscillating the vibrator arm, contacts arranged at either side of the vibrator arm with a relatively narrow gap therebetween, means for connecting the contacts in circuit with a source of current, means for mounting the contacts to adapt them to be moved in unison by and with the vibrator arm as the latter is swung to one extreme or the other, and means for frictionally resisting the movement of the contacts to prevent them from moving back with the vibrator arm when the latter swings away from its extreme of throw.

9. In a device of the type specified, the combination of a base-plate, a field magnet mounted on said plate, a post projecting from said plate, a vibrator arm resiliently mounted on said post to adapt it to oscillate in the field of the magnet, a polarizing-coil mounted on the plate surrounding the vibrator arm, a pivot pin projecting from the plate, a yoke pivoted on said pin and having arms straddling the vibrator arm, contacts carried on the arms of said yoke and insulated therefrom, and jack elements extending through the plate and connected in circuit with the contacts.

10. In a vibrator unit, the combination of a casing, a permanent magnet enclosed within said casing, a vibrator arm mounted in said casing to adapt it to oscillate in the field of the magnet, a polarizing-coil surrounding the vibrator arm, a yoke pivoted to swing laterally with the vibrator arm and independently thereof, means for frictionally resisting the swinging movement of the yoke, contacts carried by said yoke at the opposite sides of the vibrator arm, and jack members connected with the contacts and projecting through the casing to adapt the unit to be electrically connected with a source of current.

11. In a device of the type specified, the combination of a casing comprising upper and lower plates of dielectric material, a permanent magnet bordering the casing and held between its top and bottom plates, an enclosing band surrounding the marginal edges of the plates and secured thereto to seal the casing, a vibrator arm pivotally mounted on one of the plates to adapt it to oscillate in the field of the magnet, a polarizing-coil secured to said plate and surrounding the vibrator arm, a yoke pivoted to the plate with its arms straddling the vibrator arm, means to frictionally resist the movement of the yoke, contacts carried on the arms of the yoke at opposite sides of the vibrator arm, and jack elements connected in circuit with the contacts and projecting through one of the plates of the casing to adapt them to be connected in circuit with a source of current.

12. A vibrator unit comprising an oscillatable vibrator element, means to oscillate the vibrator element, opposite contacts adapted to be alternately closed with the vibrator element and to be moved in unison thereby during the throw of the latter, and means for retaining said contacts in the position into which they have been moved as the vibrator element breaks from one contact and moves toward the opposite contact.

In testimony whereof I affix my signature.

JOHN F. CAVANAGH.